US007242763B2

(12) United States Patent
Etter (10) Patent No.: US 7,242,763 B2
(45) Date of Patent: Jul. 10, 2007

(54) SYSTEMS AND METHODS FOR FAR-END NOISE REDUCTION AND NEAR-END NOISE COMPENSATION IN A MIXED TIME-FREQUENCY DOMAIN COMPANDER TO IMPROVE SIGNAL QUALITY IN COMMUNICATIONS SYSTEMS

(75) Inventor: Walter Etter, Wayside, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 817 days.

(21) Appl. No.: 10/303,797

(22) Filed: Nov. 26, 2002

(65) Prior Publication Data

US 2004/0101038 A1    May 27, 2004

(51) Int. Cl.
*H04M 1/00* (2006.01)
(52) U.S. Cl. .................... 379/406.14; 379/406.01; 379/406.08; 379/406.06; 379/392.01
(58) Field of Classification Search ........... 379/392.01, 379/406.01, 406.06, 406.08, 406.14
See application file for complete search history.

(56) References Cited

U.S. PATENT DOCUMENTS

| 4,628,526 A | 12/1986 | Germer et al. |
| 4,829,565 A | 5/1989 | Goldberg |
| 5,107,539 A | 4/1992 | Kato et al. |
| 5,509,081 A | 4/1996 | Kuusama |
| 5,524,148 A | 6/1996 | Allen et al. |
| 5,553,134 A | 9/1996 | Allen et al. |
| 7,010,118 B2* | 3/2006 | Etter ............. 379/392.01 |
| 7,058,368 B2* | 6/2006 | Nicholls et al. ........ 379/406.01 |
| 2003/0091182 A1* | 5/2003 | Marchok et al. ........ 379/392.01 |

FOREIGN PATENT DOCUMENTS

WO    WO 97/10586    9/1996

OTHER PUBLICATIONS

I.B. Thomas, R.J. Niederjohn, "Enhancement of speech intelligibility at high noise levels by filtering and clipping," J. of the Acoust. Soc. Of Am., vol. 16, 1968, pp. 412-415.
R.J. Niederjohn, J.H. Grotelueschen, "The Enhancement of Speech Intelligibility in High Noise Levels by High-Pass Filtering Followed by Rapid Amplitude Compression," IEEE Trans. On Acoustics, Speech and Signal Proc., vol. ASSP-24, No. 4, Aug. 1976, pp. 277-282.

(Continued)

*Primary Examiner*—Jefferey Harold (57) ABSTRACT

Methods and systems for a mixed time-frequency domain compander, where the expander and compressor are applied in the frequency domain (subbands), while the limiter and the linear gain are applied in the time-domain (full band). Far-end noise reduction is achieved by adapting the expander gain to the far-end noise, near-end noise compensation is achieved by adapting the linear gain and the compressor gain to the near-end noise. The range of the linear gain section is set individually for each subband, but the linear gain is essentially applied to the full band signal via a scaling procedure. The scaling procedure first reduces the compander gain in the frequency domain by a scaling factor and then performs the reciprocal reverse scaling in the time domain. Far-end noise reduction is coupled to near-end noise compensation in order to avoid cross-modulation of the far-end noise by the near-end noise.

29 Claims, 9 Drawing Sheets

OTHER PUBLICATIONS

E.F. Stikvoort, "Digital dynamic range compressor for audio," J. Audio Eng. Soc., vol. 34, No. 1/2, Jan./Feb. 1986, pp. 3-9.

W.Etter, G.S. Moschytz, "Noise Reduction by Noise-Adaptive Spectral Magnitude Expansion." J. Audio Eng. Soc., vol. 42, No. 5, May 1994, pp. 341-349.

W. Etter, "Contribution to Noise Suppression in Monophonic Speech Signals," PhD. Thesis, Swiss Federal Institute of Technologies, ETH, Diss. No. 10210, Zurich, 1993.

E.A. Kretsinger, N.B. Young, "The use of fast limiting to improve the intelligibility of speech in noise," Speech Monogr., vol. 27, 1960, pp. 63-69.

Zwicker, E., Fastl, H., "Psychoacoustics," Springer 1990.

* cited by examiner

SYSTEMS AND METHODS FOR FAR-END NOISE REDUCTION AND NEAR-END NOISE COMPENSATION IN A MIXED TIME-FREQUENCY DOMAIN COMPANDER TO IMPROVE SIGNAL QUALITY IN COMMUNICATIONS SYSTEMS

TECHNICAL DESCRIPTION OF THE INVENTION

The present invention is directed to communications systems, and more particularly to a communications system using far-end noise reduction and near-end noise compensation to improve the clarity of the communications link.

BACKGROUND

Although cell-phones have become increasingly popular over the last decade, their use in "noisy" environments, such as restaurants, airports, train stations, arenas, and the like, have been limited due to a lack of appropriate speech enhancements. In the past, background noise has been addressed mainly by manual volume controls located on the mobile handset. However, these manual controls are usually inconvenient to use and ineffective in compensating for the background noise of the environment, especially in environments where the background noise changes rapidly. Manual interaction by the caller is often inaccurate both in time and magnitude, that is, compensation may come too late and too loud.

In these adverse environments, automatic noise compensation greatly improves conversation conditions and reduces the inconvenience of the caller. Referring to the two sides of the telephone link as "near-end" and "far-end," an elementary realization of a near-end noise compensator consists of a noise-adaptive gain controller for the far-end signal, whereby the gain applied is proportionate to the near-end noise level.

Intelligibility losses due to background noise are well known. One solution to reduce the impact of background noise on intelligibility losses uses a "clipping" technique. Although clipping improves intelligibility, it adds distortion to the received signal. Other techniques have improved intelligibility by high-pass filtering, dynamic compression, or a combination of these two. However, none of these early systems used an expander to avoid undesired far-end noise.

In addition, although there has been a proliferation in the research of automatic noise compensation and automatic noise reduction, these two functions have been implemented as separate entities (i.e., without being coupled to one another). In the absence of coupling the two functions, noise compensation leads to far-end noise modulation (i.e., far-end noise is modulated by near-end noise). In other words, all the level changes of the near-end noise are echoed in the far-end noise, which is an unwanted and annoying artifact. For example, when the near-end noise follows a pattern of loud-soft-loud, the far-end noise follows the same pattern. Noise compensation should be designed such that near-end noise purposely and only modulates far-end speech, but no modulation should result for the far-end noise. In general, amplitude modulation of a near-stationary signal such as steady background noise sounds unnatural and artificial while amplitude modulation of a non-stationary signal, such as speech, is acceptable to an extent. Human ears are by a magnitude more sensitive to amplitude modulation of near stationary noise than to amplitude modulation of speech.

The previous noise compensation methods unfortunately have the unpleasant side-effect of amplifying the far-end noise, since the noise compensation methods have been unable to discriminate between the signal and noise. Therefore, whenever the signal is amplified, the far-end noise is also amplified. One method to reduce this unwanted side-effect is to use an expander operating in the time domain. The method works well if the signal is disturbed only by moderate or weak background noise. Unfortunately, if the far-end signal is disturbed by strong ambient noise, the time-domain expander is unable to adequately reduce the noise. Thus, there is a need in the art for a compander which couples the noise compensation and noise reduction functions into a single compander which is able to adequately reduce excessive far-end noise and eliminate any effects of the near-end noise echoed in the far-end noise signal.

SUMMARY OF THE INVENTION

The present invention meets the needs described above in a noise-adaptive compander that amplifies the individual frequency components of the far-end signal by a gain value based on the noise estimates of a near-end signal and a far-end signal. Generally described, the invention is directed toward a noise-adaptive compander adapted to amplify a far-end signal based on a near-end noise level estimate of a near-end signal and constrained by a far-end noise level estimate. The compander contains a first filter bank that separates the far-end signal into a number of frequency bands. The compander also contains a first noise estimator, which generates a noise estimate sequence from the near-end signal and a second noise estimator that generates a noise estimate sequence from the far-end signal. The compander further contains several gain units for computing the gain values for the far-end signal. Specifically, the compander contains a noise-adaptive gain control (NGC) unit, which generates a gain value using the near-end noise estimate generated by a noise estimator. The NGC gain is used to calculate a "total" gain value for the full band signal. The transition points for the expander region, the linear region, the compressor region, and the limiter region are determined by the underlying compander rule applied, which can be either input-bounded, output-bounded, or mixed input-output bounded, as describe in the U.S. patent application Ser. No. 09/956,954 entitled "Noise Compensation Methods and Systems for Increasing the Clarity of Voice Communications" by Walter Etter.

The total gain value is then used to create a compression gain curve according to the pre-selected rule (i.e., input, output, and input-output bounded compression). The total gain value is used to set the level of the linear gain region. The compression gain computation consists of two parts. First, a target gain value is computed, which is represented by the static compression curve. Second, a dynamic response is computed, which is determined by the attack and release time constants as described in the U.S. patent application Ser. No. 09/956,954 entitled "Noise Compensation Methods and Systems for Increasing the Clarity of Voice Communications" by Walter Etter, and herein incorporated by reference. The subband signal level determines the point on the compression curve and thereby sets the target gain value for the subband. The target compression gain is filtered by the attack and release control within the compressor gain computation unit.

The far-end noise estimate and the pre-set maximum amount of noise reduction are used to set the expander gain curve. The subband signal level determines the point on the expansion curve and thereby set the target expansion gain value for the subband. The target expansion gain is subsequently filtered by the attack and release control within the expander gain computation unit.

Next, a master gain unit selects a master gain value for each subband. The master gain value is equal to the minimum out of the compression gain value, the expander gain value, and the total gain value. In the absence of an AGC gain unit, the total gain value equals the noise-adaptive gain value. Once the master gain value is determined for each subband, the subband gain values are combined with the corresponding subband signals of the far-end signal in a combiner unit. The combiner unit is typically a multiplier unit which multiplies the master gain value with the appropriate subband signal of the far-end signal. Lastly, the compander contains a synthesis filter bank, which receives the output of the combiner unit and recombines the subbands of the modified far-end signal into a full band signal.

The present invention may also include an AGC gain unit which computes a level normalization gain value for the far-end signal. The level normalization gain value is computed for the full band signal rather than for each subband. Additionally, the compander may also include a combiner unit for combining the noise-adaptive gain value and the level-normalization gain value into the total gain value. This newly computed total gain value is then used to create the compression gain curve in the compression gain unit.

The compander may further include a scaling unit, which is used to apply a scaling factor to the master gain values for each subband in the far-end signal. The scaling factor reduces the individual master gain values to a value of less than or equal to one to avoid saturation.

The compander may further include a gain smoothing unit that smoothes each subband master gain value by averaging each master gain value with the immediately neighboring values. That is, the master gain, $G_M$, at frequency index k, is averaged with the master gain values having frequency indices k−1 and k+1. Additionally, the compander may further include a limiter unit to reduce any peaks in the reconstructed full band signal and a reverse scaling unit to amplify the full band signal by multiplying the full band signal with the inverse of the scaling factor.

The present invention also includes a method for amplifying the far-end signal based on near-end noise estimates.

The various aspects of the present invention may be more clearly understood and appreciated from a review of the following detailed description of the disclosed embodiments and by reference to the appended drawings and claims.

DETAILED DESCRIPTION OF THE EMBODIMENTS

The present invention is typically embodied in a mixed time-frequency domain compander, where the expander and compressor are implemented in the frequency domain (subband signals), while the limiter and the linear gain sections are implemented in the time-domain (full band signal). Although the gain of the linear gain section is calculated using subband signals, the gain is applied to the full band signal via a scaling procedure. The scaling procedure first scales back the compander gain in the frequency domain by the scaling factor and then performs the reciprocal reverse scaling on the time-domain (full band) signal. If the linear gain were applied in the frequency-domain, overflow (clipping) could not be prevented in the time-domain. Although a single frequency component may well be under the clipping level, the sum of all frequency components, which is essentially calculated in the inverse Fourier transform, may result in overflow in the time domain, depending on the phase relationship of the individual frequency components.

By realizing the expander part of the compander in the frequency domain, the compander is capable of reducing far-end noise in a wider dynamic range from low-level to high-level noise, whereas only low-level noise is reduced in a typical time-domain only expander. Furthermore, the compander operating on subband signals greatly reduces intermodulation between the individual subband signals, which occurs when far-end speech modulates far-end noise. For example, in a typical time-domain compander, a loud voiced vowel with strong frequency components at lower frequencies (e.g. /a/, /u/, /o/) may cause a short-term reduction of the compensation gain throughout the entire frequency spectrum leading to noticeable far-end noise modulations or fluctuations. However, in the compander of the present invention which operates on the subband signals, a vowel with strong frequency components at lower frequencies would only reduce the gain at lower frequencies, thereby producing significantly less intermodulation. The relation between noise reduction and dynamic range expansion has been analyzed in Etter, W. and Moschytz, G. S., "Noise Reduction by Noise-Adaptive Spectral Magnitude Expansion," J. Audio Eng. Soc., Vol. 42, No. 5, May 1994, pp. 341–349, and herein incorporated by reference.

Yet another advantage of the exemplary compander operating on subband signals is the ability to generate louder far-end speech. More so, if the compressor range is adapted to the near-end noise level. Higher speech levels in turn increase intelligibility in severely noisy environments.

Yet another advantage of the exemplary compander is that cross-modulation (i.e., where the near-end noise modulates the far-end noise) is avoided. In other words, far-end noise is always at or below its original level and therefore is not affected by a time-variant noise compensation gain. This property is achieved by coupling far-end noise reduction with near-end noise compensation.

Figure 1:
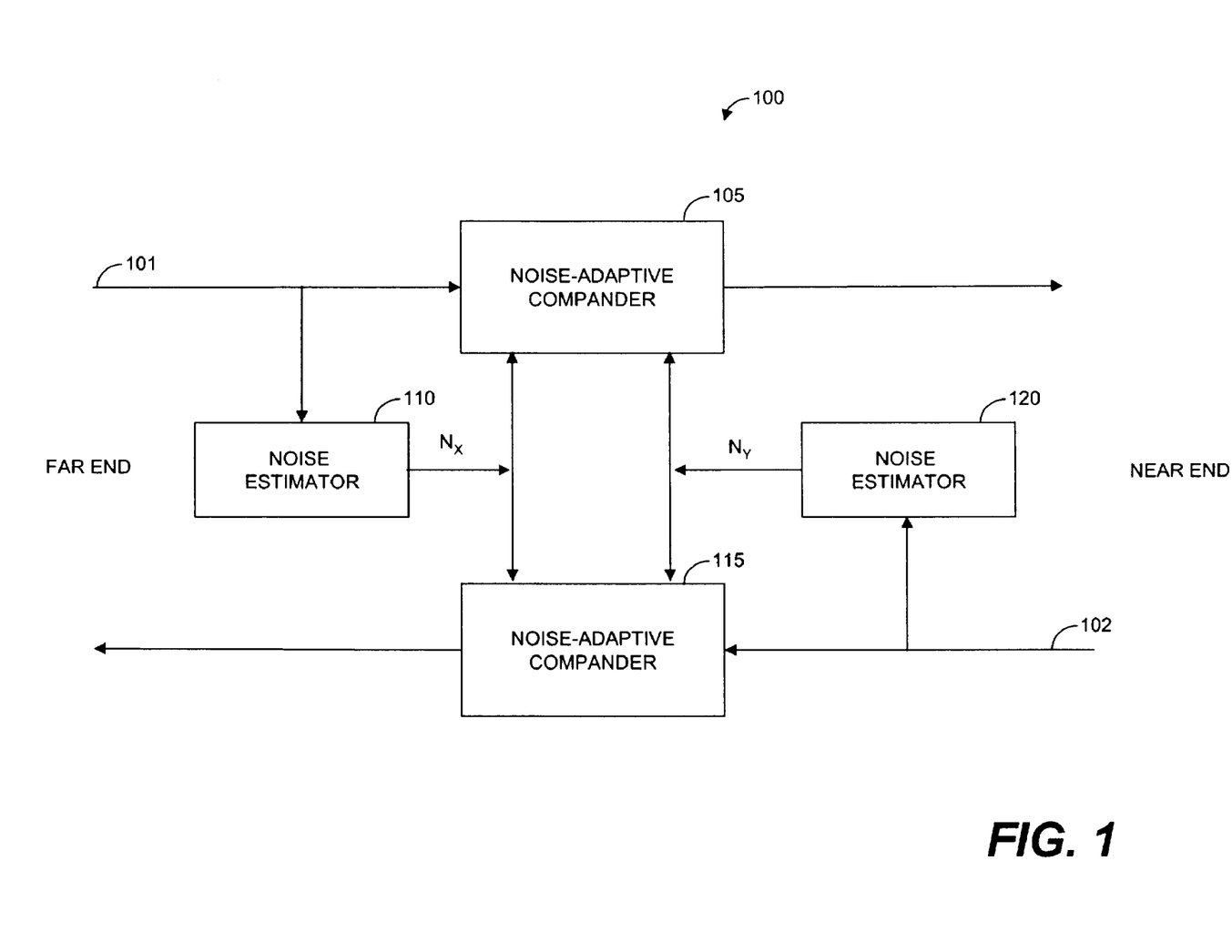
FIG. 1 is a block diagram illustrating an exemplary two-way noise-adaptive compander.

Turning now to the figures, in which like numerals refer to like elements through the several figures, FIG. 1 is a block diagram illustrating an exemplary two-way "compander" 100. The term "compander" is derived from combing the terms "compressor" and "expander." The two-way compander 100 consists of a far-end compander 105 dedicated to process the far-end signal 101, a far-end noise estimator 110, a near-end compander 115 dedicated to process the near-end signal 102, and a near-end noise estimator 120. Both the far-end compander 105 and the near-end compander 115 may operate both as a compressor and as an expander to regulate a signal, as the term implies. In the exemplary embodiment, the far-end noise estimator 110 uses the far-end signal to derive a far-end noise estimate sequence, $N_X$. Similarly, the near-end noise estimator 120 uses the near-end signal to derive a near-end noise estimate sequence, $N_Y$. Both noise estimate sequences, $N_X$ and $N_Y$, are then passed to the far-end compander 105 and near-end compander 115, which use the noise estimates to calculate the appropriate gain level that need to be applied to the far-end signal 101 and the near-end signal 102. Once the gain levels are set, the far-end compander 105 then applies the gain to the far-end signal 101 and passes it on to the near-end. Similarly, the near-end compander 115 applies the gain to the near-end signal 102 and passes it to the far-end.

Simple noise estimators use the signal level (time-domain noise estimator) or the signal spectrum (frequency domain noise estimator) during speech pauses to derive a noise estimate. Advanced noise estimators continuously adapt to noise, not only during speech pauses, but also during speech activity. Continuously adapting noise estimators are described in Etter, W., "Contributions to Noise Suppression in Monophonic Speech Signals," Ph.D. thesis, Swiss Federal Institute of Technologies, ETH, Diss. No. 10210, Zurich, 1993 and in U.S. patent application Ser. No. 09/107,919 entitled "Estimating the Noise Component of a Signal" filed Jun. 30, 1998 by Walter Etter.

It should be understood that the compander 100 of the present invention may be used in a device, such as a telephone handset, or in a subsystem of a communications network, such as a Mobile Switching Center (MSC), or any other communications network that is capable of handling voice communications. It should be further understood that although the terms "far-end" and "near-end" are typically associated with the implementation in a device, such as a telephone for purposes of this application, the terms "far-end" and "near-end" are not subject to such a narrow interpretation and are used to describe the implementation of the compander in any communications system (either device or network). To generalize, the terms "far-end" and "near-end" may be replaced by the terms "A-side" and "B-side."

Figure 2:
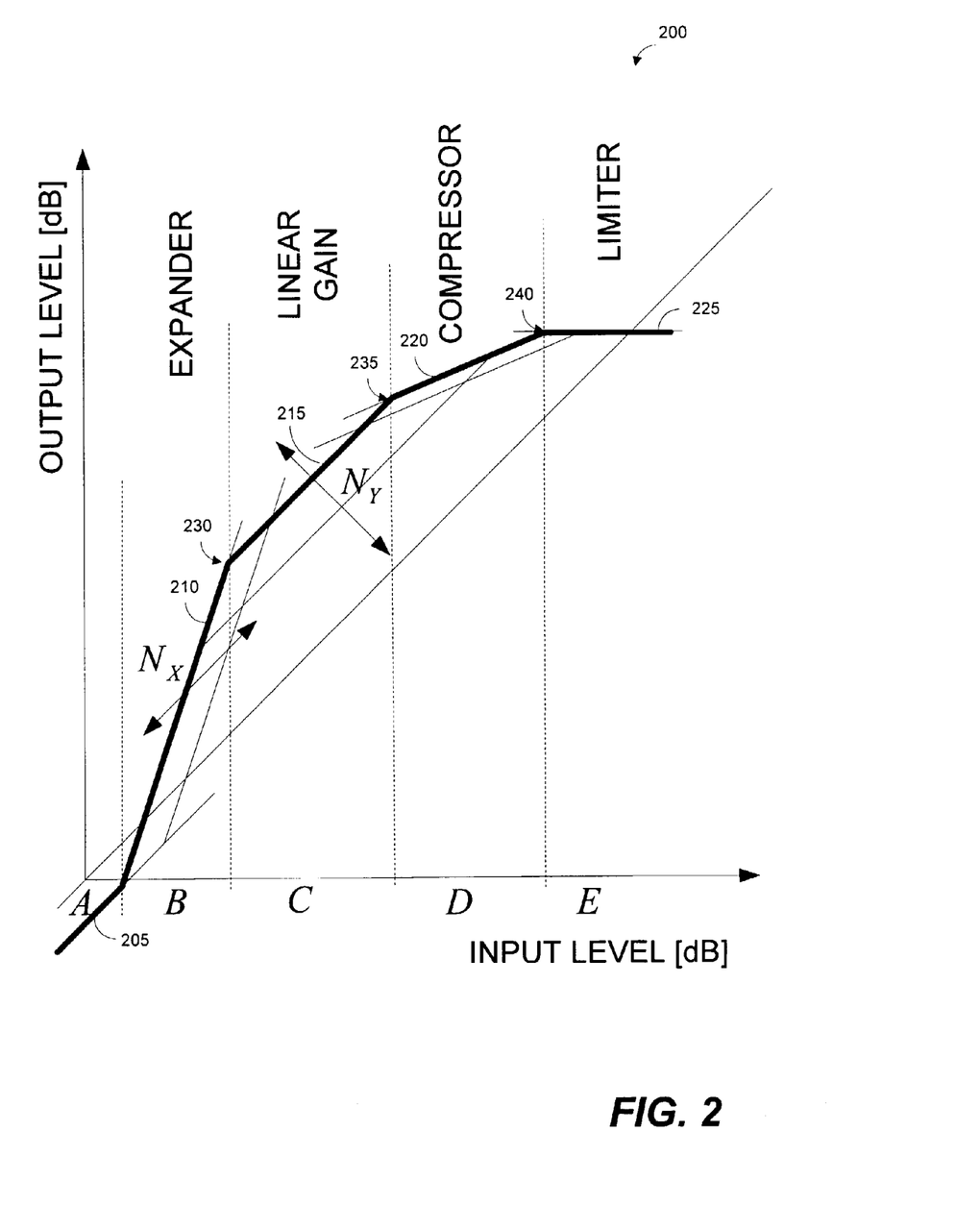
FIG. 2 is an illustration of an exemplary input-output characteristic curve for the compander in accordance with the present invention.

FIG. 2 is an exemplary input-output curve for the compander 100. The input-output curve 200 has five (5) separate regions, namely a linear attenuation region 205, an expander region 210, a linear amplification range 215, a compressor amplification region 220, and a limiter region 225. The vertical axis of the gain curve 200 represents the level of a signal output from the compander used to drive an audio speaker amplifier or the like. The horizontal axis represents the signal level input in the compander from an input device, such as a microphone preamplifier.

While operating in the expander region 210 of the gain curve 200, the compander 100 amplifies the far-end signal by a value that depends on the far-end noise estimate, $N_X$. As shown in FIG. 2, the far-end noise signal, $N_X$, shifts the expander region 210 either upward or downwards depending upon the noise level, $N_X$. Thus, the expander utilized in the present invention is known as a "noise-adaptive" expander. The expander region 210 allows the compander 100 to amplify relatively low input signal level variations into relatively high output signal level variations. Once the input levels reach a threshold value 230, which occurs when the expander gain equal the total gain, the compander 100 operates in the linear amplification region 215 along the gain curve 200. The point on the curve where the transition between the expander region 210 and the linear amplification region 215 occurs is known as the linear onset point 230. Within the linear amplification region 215, the compander 100 applies a linear amount of amplification to the input signal. In other words, the input signal is amplified in the entire linear region by an equal amount.

Once the input level has exceeded a second threshold value, the compander 100 ceases operating in the linear region 215 and begins to operate in the compression region 220. The point on the curve where the transition between the linear amplification region 215 and the compressor region 220 occurs is known as the compressor onset point 235. Once the input level has exceeded a final threshold value, the compander 100 is then adapted to operate in a limiter region 225. It should be noted that whenever the compander 100 is operating in the linear gain region, it is adapted to apply an amount of amplification determined by the near-end noise level, $N_Y$. Whenever the compander is operating in either the compressor region 220 or the limiter region 225, the amount of amplification determined by the near-end noise level is not fully applied, but gradually reduced for an increased input level.

Figure 3:
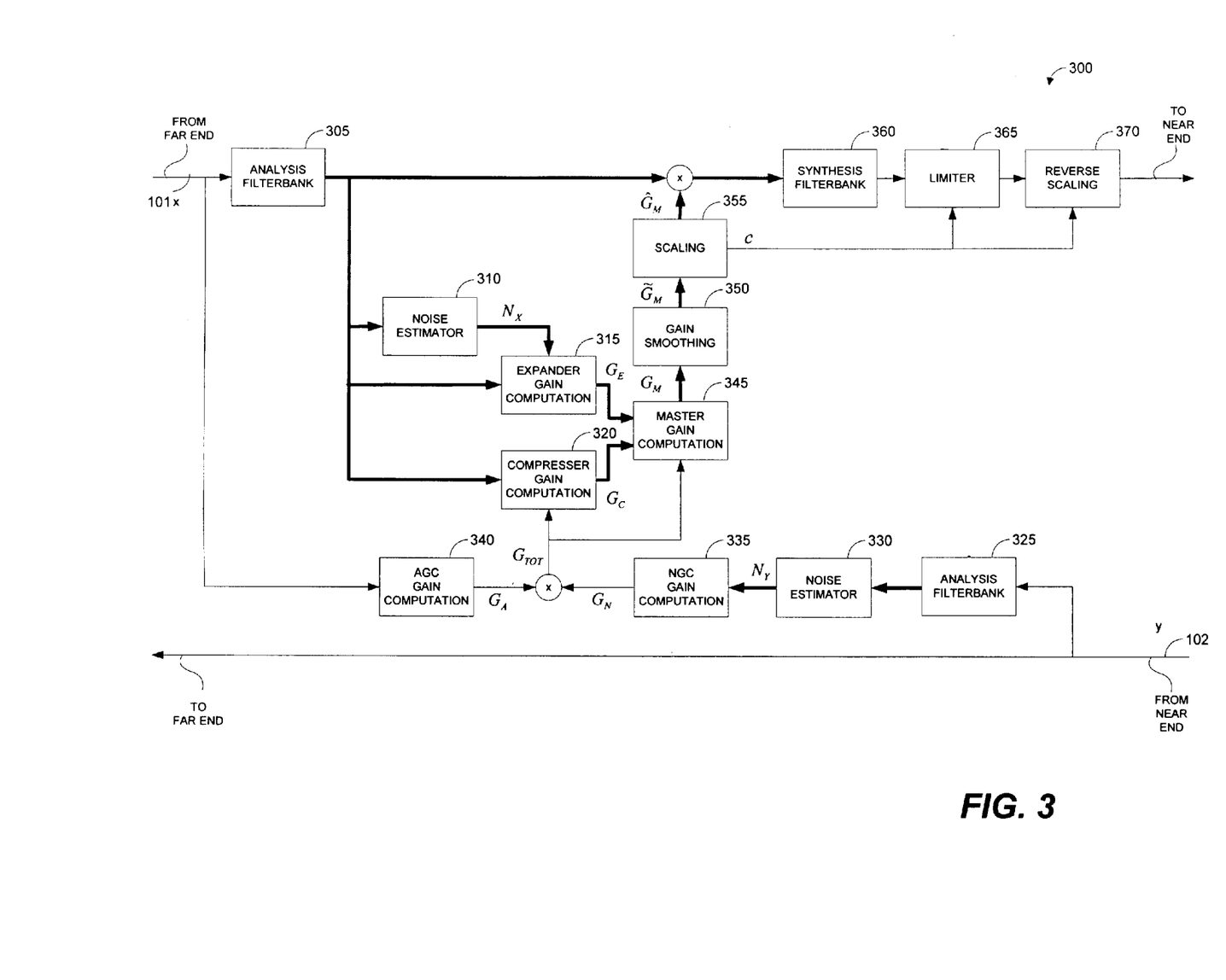
FIG. 3 is an illustration of a block diagram illustrating an exemplary mixed time-frequency domain compander.

FIG. 3 is a block diagram illustrating an exemplary embodiment of a mixed time-frequency "compander" 300. The compander 300 may be adapted to operate either as an expander (i.e., in the expander region) or as a compressor (i.e., in the compression region). The level of noise reduction applied by the compander to reduce the far-end noise within a communications system is determined by both far-end and near-end noise levels. It should be noted that compander 300 may be either a compander for the far-end signal or a compander for the near-end signal, as depicted in FIG. 1. However, to simplify the explanation, the operation of the far-end compander 105 is described. Those skilled in the art will appreciate that the foregoing description is equally applicable to operation of the near-end compander 115 shown in FIG. 1. It should be noted that FIG. 1 is a general block diagram of a two-way compander. FIG. 1 does not illustrate any specific realization of the far-end noise estimator 110 and the near-end noise estimator 120 or the far-end compander 105 and the near-end compander 115. Each of these units may be realized in either the time domain or the frequency domain. When they are realized in the frequency domain, the far-end estimator 110, the near-end estimator 120, the far-end compander 105 and the near-end compander 115 all conceptually include an analysis filter bank that splits the input signals into a number of frequency bands. It should be apparent to those skilled in the arts however, that each of the analysis filter banks that have the same input signal may be combined. For example, the same analysis filter bank may be used for the far-end noise estimator 110 and the far-end noise adaptive compander 105. Therefore, only one analysis filter bank 305 is used in FIG. 3 for the far-end signal.

The far-end signal 101 is input into a filter bank 305, which is typically a discrete Fourier Transform (DFT). However those skilled in the art will appreciate that other filters banks, such as wavelet or critical band filter banks, may be employed without departing from the scope of the invention. The filter bank 305 splits the far-end signal 101 into a number of subband signals, which are provided to the compander 105. In FIG. 3, the subband signals and subband gain values are represented by the thick lines, whereas the full band signal and the full band gain values are represented by the thin lines. The subband signals are input to a far-end noise estimator 310, which is adapted to detect and estimate the noise levels within each frequency band associated with an input device at the far-end. Typically, the input device is a microphone. Those skilled in the art however, will appreciate that other input devices, such as an audio playback system, or the like may be used as an input device without departing from the scope of the invention.

The far-end noise estimator 310 constantly generates a noise estimate, $N_X$, for each subband of the far-end signal 101. The noise estimate $N_X$, along with the subband signals are then input into an expander gain unit 315, which calculates an expander gain value, $G_E$, for each subband. In the exemplary embodiment, the expander gain value, $G_E$, is determined using a single gain curve, more specifically a prototype expander gain curve, which is either stored in a look-up table or calculated using the expander gain unit 315. The position of the gain curve is adjusted in the expander gain unit 315 for each subband to reflect the far-end noise level in each subband. The expander gain unit 315 uses the noise estimate, $N_X$, to determine the appropriate gain curve for each subband and thereby set the linear onset point 230 on the gain curve 200.

The subband signals are also input to a compressor gain unit 320, which calculates individual compressor gain values, $G_C$, for each of the subbands. The compressor gain unit 320 uses a single compression gain curve, more specifically a prototype compression gain curve, to calculate the compression gain, $G_C$, for each subband. The position of this gain curve is adjusted in the compressor gain unit 320 to reflect the total gain value, $G_{TOT}$.

The full band signal may also be input into an AGC gain unit 340, which calculates a level-normalization gain value, $G_A$.

Simultaneously, the near-end full band signal is input into a second filter bank 325, which separates the full band signal into a number of subband signals. Each subband signal is then sent to the near-end noise estimator 330, which generates the noise estimate sequence, $N_Y$ for each subband. The noise estimate sequences, $N_Y$, are then passed to a NGC gain unit 335, which calculates a single noise-adaptive gain value $G_N$. The noise-adaptive gain value, $G_N$, is then multiplied with the previously calculated level-normalizing gain value, $G_A$, to create a total gain, $G_{TOT}$, for the far-end compander 105. The total gain, $G_{TOT}$, of the compander is given by the equation:

$$G_{TOT} = G_A * G_N$$

Alternatively, the AGC unit 340 may be excluded from the compander 300, in which case the total gain is equal to the noise-adaptive gain value. Also, instead of a frequency-domain noise estimator, a considerably simpler time-domain noise estimator can be used, which does not require the analysis filter bank on the near-side. A time-domain estimator only provides one full band noise estimate, as opposed to a noise spectrum. In addition, a time-domain noise estimator is generally inferior to a frequency-domain noise estimator in terms of accuracy and adaptation speed.

The total gain, $G_{TOT}$, is input to the compressor gain unit 320, where it is used to vary a compressor onset point on the compressor gain curves (i.e., the point along the gain curves where the linear gain region ends and a compression region begins). The onset point for the compression region is varied by shifting the entire compression curve downwards or upwards.

The expander gain values, $G_E$, for each subband, the compressor gain values, $G_C$, for each subband, and the total gain value, $G_{TOT}$, are then input into a master gain unit 345. The master gain unit 345 selects a master gain value, $G_M$, for each subband of the far-end signal 101. The master gain value, $G_M$, is used to amplify or reduce each of the corresponding subband signals of the far-end signal 101. The master gain value, $G_M$, for each subband is calculated using the equation:

$$G_M = \min\{G_E, G_C, G_{TOT}, G_{MAX}\}$$

where $G_{MAX}$ is a pre-set maximum value that may be configured by the user and is used to set the maximum gain of the compander. For example, $G_{MAX}$ may be set to 20 dB. In the master gain unit 345, the noise reduction gain is coupled to the noise compensation gain by limiting the expander gain to $G_{TOT}$. In other words, noise reduction is coupled to noise compensation by keeping the amount of noise reduction equal to the amount of noise compensation or when the amount of noise reduction equals the amount of noise compensation plus a constant value. The expander gain curve, when combined with the linear gain curve and the compressor gain curve to create the compander system curve (described below), insures that there is no time-variable gain in the far-end noise region. Thus, the far-end noise signal remains at its original level (or a fixed amount below its original level).

The master gain values, $G_M$, for each subband are then passed through a gain smoothing unit 350. The gain smoothing unit 350 filters each subband master gain value, $G_M$. This smoothing operation may be performed along the frequency axis, along the time axis, or along both the time and frequency axes. For example, in a simple implementation, the master gain value, $G_M(k,i)$ for a frequency index k, and time index i, may be calculated by determining a weighted average of only three neighboring values. That is, only the master gain values at frequency indices k−1, k, and k+1 and the time indices i (current time index), i−1 and i−2 (passed time indices) are taken into account. Typically, smoothing the master gain values is a two-step process. First, smoothing along the frequency axis may be calculated from the equation:

$$\overline{G}_M(k, i) = \frac{1}{4}G_M(k-1, i) + \frac{1}{2}G_M(k, i) + \frac{1}{4}G_M(k+1, i)$$

Next, smoothing along the time axis may be calculated using the equation:

$$\tilde{G}_M(k, i) = \frac{1}{2}\overline{G}_M(k, i) + \frac{1}{3}\overline{G}_M(k, i-1) + \frac{1}{6}\overline{G}_M(k, i-2)$$

Alternatively, smoothing may be a single step process in which smoothing is applied only along a single axis. For the special case, when smoothing is applied along only the frequency axis, the smoothed master gain values may be calculated using the equation:

$$\tilde{G}_M(k, i) = \frac{1}{4} G_M(k-1, i) + \frac{1}{2} G_M(k, i) + \frac{1}{4} G_M(k+1, i)$$

For the special case, when smoothing is applied only along the time-axis, the smoothed master gain values may be calculated using the equation:

$$\tilde{G}_M(k, i) = \frac{1}{2} G_M(k, i) + \frac{1}{3} G_M(k, i-1) + \frac{1}{6} G_M(k, i-2)$$

Those skilled in the art will appreciate that other weighting schemes may be applied. For example, smoothing across frequency bands may be performed by critical band weighting, in which frequency bands within critical bands are averaged. For a review of critical bands, see Zwicker, E. and Fastl, H., "Psychoacoustics," published by Springer 1990.

The smoothed gain values $\tilde{G}_M$ (k,i) are then passed through a scaling unit 355. The scaling unit 355 insures that the largest gain value is scaled to a value less than or equal to one. For this purpose, the maximum gain value, $\max\{\tilde{G}_M(0,i), \tilde{G}_M(1,i), \ldots \tilde{G}_M(N-1,i)\}$, is determined out of the N subbands at each time instance, i. The value, $\max\{\tilde{G}_M(0,i), \tilde{G}_M(1,i), \ldots \tilde{G}_M(N-1,i)\}$ is determined from the subband master gain values. The maximum gain value is then used to scale all of the other gain values. For implementation efficiency, a larger scaling factor may be used, such as the maximum gain value rounded up to the nearest power of 2. For example, if the maximum gain value is 7, $\max\{\tilde{G}_M(0,i), \tilde{G}_M(1,i), \ldots \tilde{G}_M(N-1,i)\}$ may be rounded up to 8 ($2^3$). When the scaling unit 355 is implemented on a DSP, rounding up to the nearest power of 2 allows the use of simple and inexpensive shift operation, rather than requiring a complex division to perform the scaling. The scaled gain values may be calculated using the equation:

$$\hat{G}_M(k, i) = \frac{1}{c} * \tilde{G}_M(k, i) \quad \text{for} \quad 0 \leq k \leq N-1$$

where c may be determined by the equation $c=\max\{\tilde{G}_M(0,i), \tilde{G}_M(1,i) \ldots \tilde{G}_M(N-1,i)\}$ as indicated above. By scaling the gain values in this way, the inverse Fourier transform will produce a time-domain signal without saturating. Note that maximum of the filter master gain values is smaller than the total gain. That is, $\max\{\tilde{G}_M(0,i), \tilde{G}_M(1,i), \ldots \tilde{G}_M(N-1,i)\} \leq G_{TOT}$. Therefore, to further reduce the complexity of the algorithm, one can also derive the scaling factor from the total gain $G_{TOT}$ by using $c \approx G_{TOT}$ The scaled master gain values, $\hat{G}_M$, (time and frequency indices not shown for simplicity) are then combined with the corresponding subband signals to modify the far-end signal. The modified subband signals are then passed through a synthesis filter bank 360, which combines the subband signals into a full band signal. In the exemplary embodiment the synthesis filter is an inverse discrete Fourier transform unit. However, those skilled in the art will appreciate that other types of synthesis filter banks, such as wavelet or critical band filter banks may be employed without departing from the scope of the invention. The full band signal is then input to a limiter 365 along with the scaling factor, c, which is provided by the scaling unit 355. The limiter 365 reduces the "peaks" in the time-domain signal so that any subsequent reverse scaling, or amplification, does not result in saturation. Lastly, the output of the limiter 365 is input to a reverse scaling unit 370, which amplifies the time-domain signal up to the desired amplitude level by multiplying the output of the limiter by the scaling factor, c. The reverse scaling unit 370 provides the linear gain, reduced by the compressor gain, the expander gain, and the limiter gain. In other words, the linear gain and the limiter gain are applied to the full band signal, while the expander gain and the compressor gain are applied to the subband signals.

Figure 4:
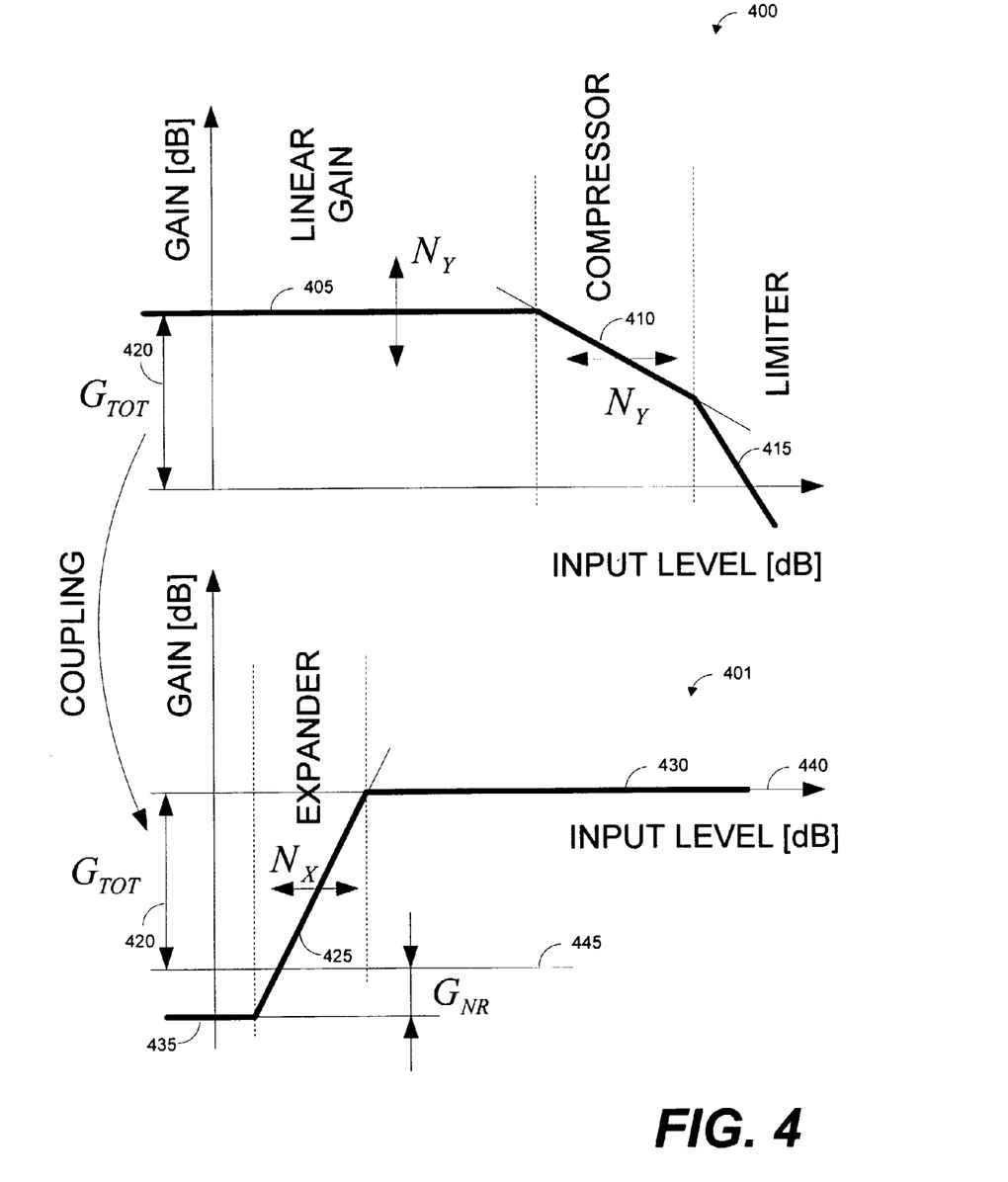
FIG. 4 is an illustration of coupling between a noise compensation gain and a noise reduction gain curve used in conjunction with the mixed time-frequency compander.

FIG. 4 is an illustration of the coupling between the noise compensation gain curve 400 and the noise reduction gain curve 401 when noise reduction and noise compensation are implemented in two separate entities. By coupling the noise reduction to the noise compensation, cross modulation of the far-end noise by the near-end noise is avoided. Once the total gain, $G_{TOT}$ 420, has been calculated (described above), the coupling of the compensation gain curve 400 to the noise reduction gain curve 401 is achieved by reducing the noise reduction gain curve 401 by an equal amount (or an equal amount plus a constant) in the region where far-end noise occurs. If the compensation gain 405 is combined with an equal but negative noise reduction gain 435, these parts sum up to a value of zero gain in the far-end noise region. In this way, the near-end noise will not modulate the far-end noise and the far-end noise will be at its original level. In order to reduce the far-end noise, an additional negative gain, $G_{NR}$, as shown in FIG. 4, may be added to the far-end noise region.

When the noise compensation and noise reduction are separate entities, these functions are carried out in sequence. That is, the far-end signal is first processed by the noise reduction and then by the noise compensation, or vice versa. In the case of separate entities, line 440 is the horizontal coordinate (abscissa) of the noise reduction graph 401. Since the total gain, $G_{TOT}$ 420, is already applied in the noise compensation entity, zero gain is applied in the linear section 430 of the noise reduction entity. When noise reduction and noise compensation are realized in the same entity, line 445 is the horizontal coordinate (abscissa) of the noise reduction graph 401, which means that a gain of $G_{TOT}$ 420 is applied in the linear region 430. The noise compensation gain 400 and the noise reduction gain 401 represent the two parts of the compander gain curve. In this case, the coupling is established directly by a compander gain curve, as illustrated in FIG. 5.

Figure 5:
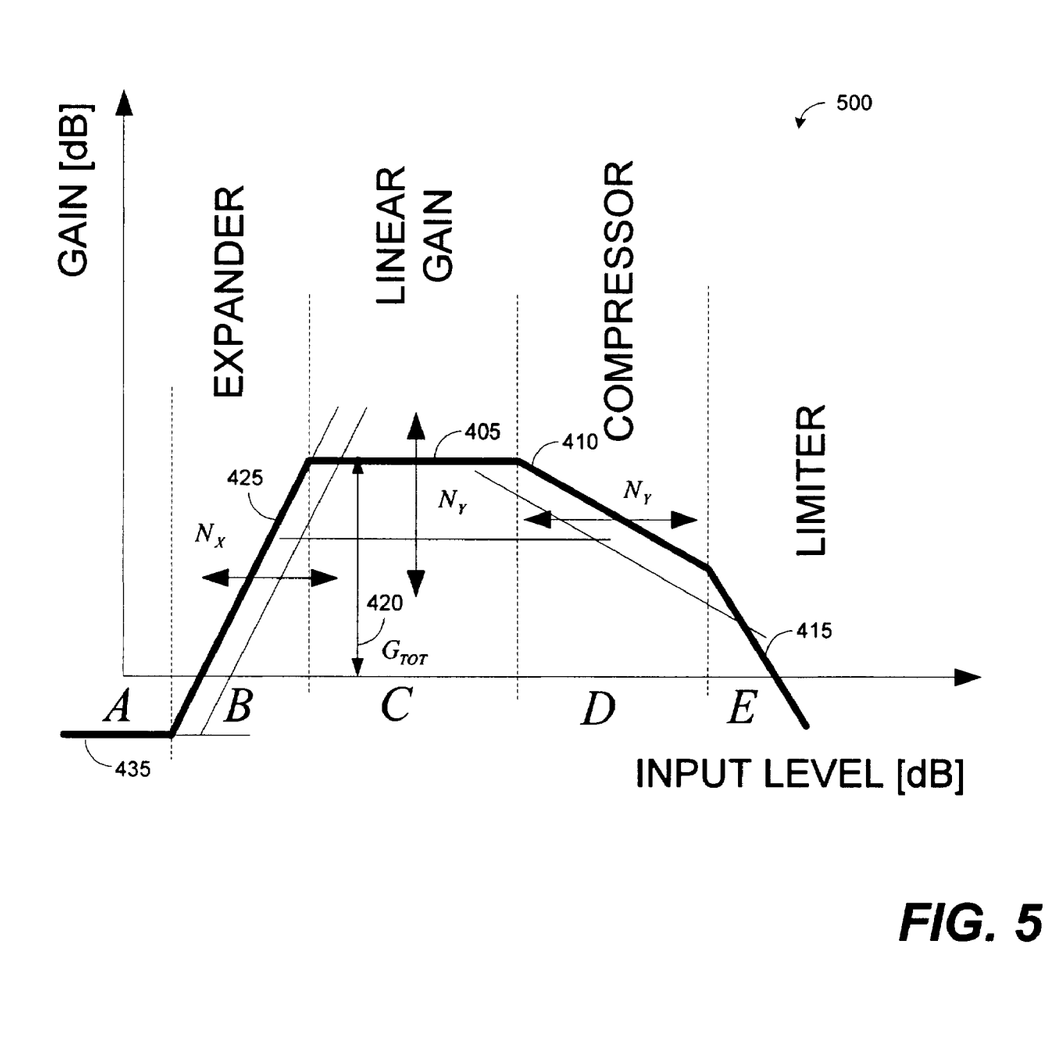
FIG. 5 is an illustration of an exemplary mixed time-frequency compander gain curve that corresponds to the input-output characteristics curve shown in FIG. 2.

FIG. 5 is an illustration of an exemplary compander gain curve 500 for compander 100 with coupling between the noise compensation gain curve 400 and the noise reduction gain curve 401 in order to avoid cross modulation. The total gain in the far-end noise region 435 is constant and independent of the near-end noise, $N_Y$. Consequently, the far-end noise will not be modulated by the near-end noise. Furthermore, if the total gain in the far-end noise region 435 is negative, as shown in FIG. 5A, the far-end noise is reduced by an equal amount.

Figure 6:
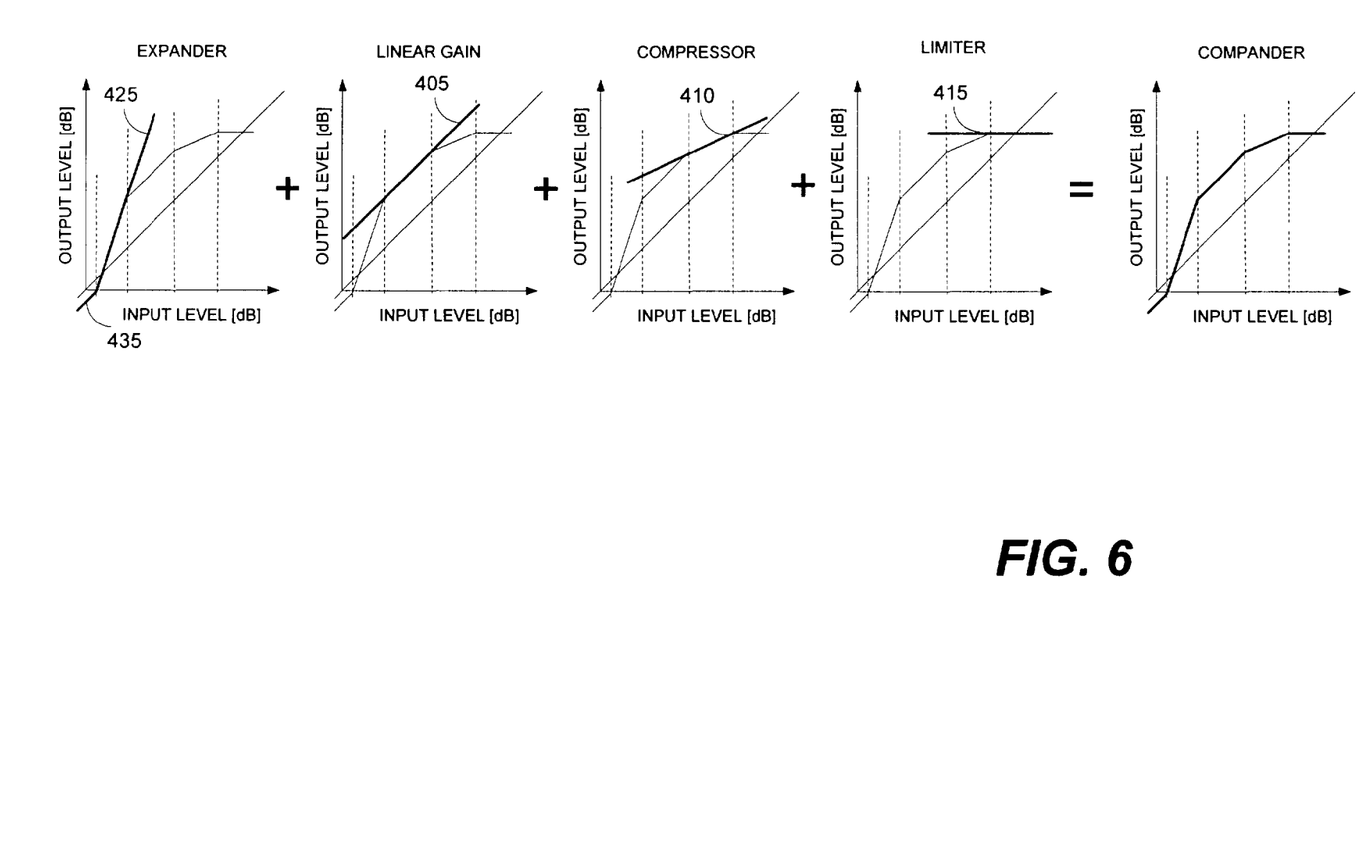
FIG. 6 is an illustration for the construction of an exemplary input-output compander characteristic curve.

FIG. 6 is an illustration for the build-up construction of the compander input-output characteristic that corresponds to the gain curve 500. The expander gain 425 and the compressor gain 410 are applied to the subband signals. The linear gain 405 is applied to the full band signal via a scaling procedure but the range of the linear gain section 405 is set separately for each subband. The limiter gain 415 is also applied to the full band signal. FIG. 6 shows the combined effect of these four compander sections for a single subband.

Figure 7:
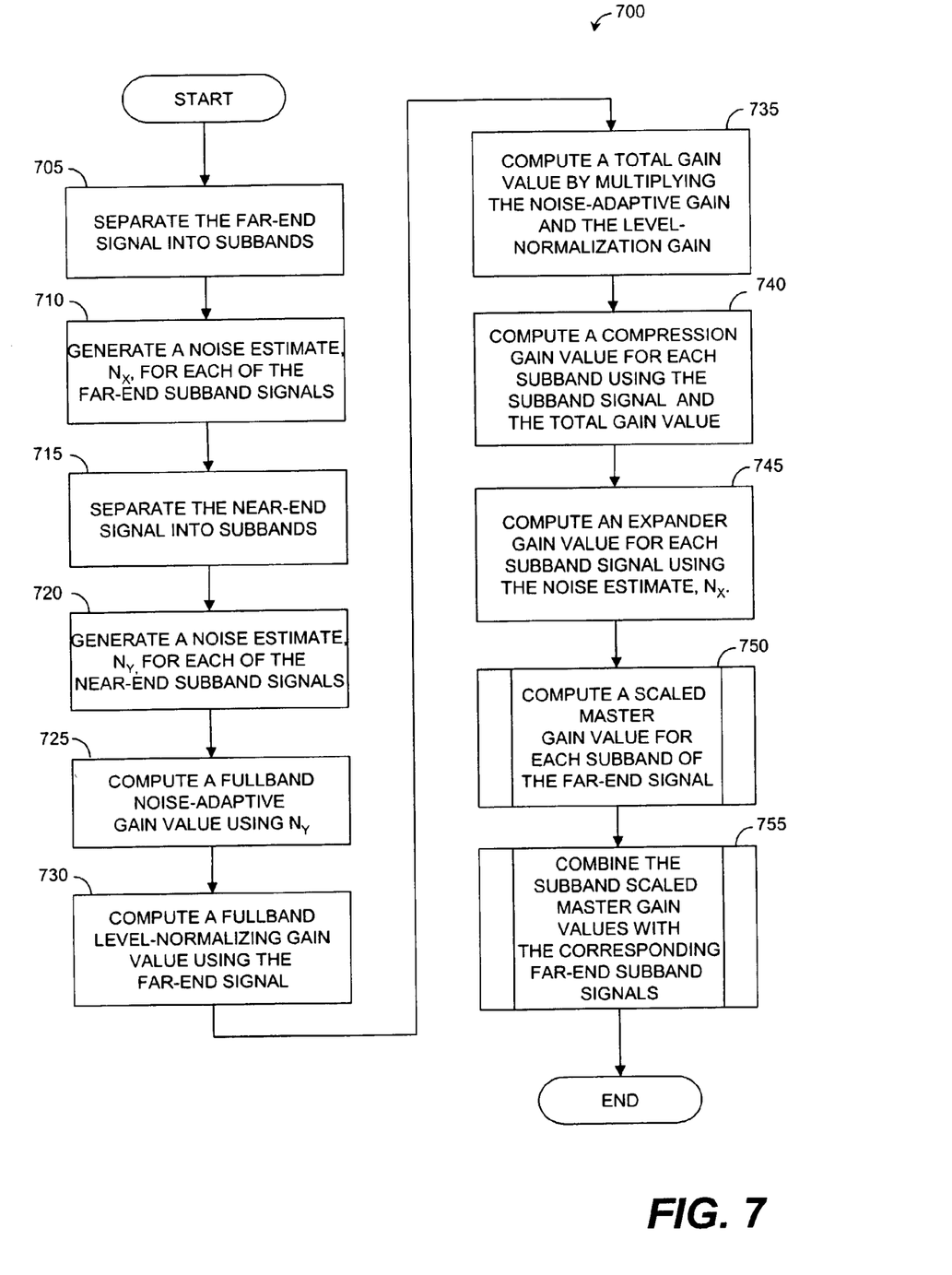
FIG. 7 is a logic flow diagram illustrating an exemplary routine for amplifying a far-end signal using noise estimates of both a far-end and a near-end signal.

FIG. 7 is a logic flow diagram illustrating an exemplary routine 700 for reducing the far-end noise and compensating for near-end noise in a communications system. The routine 700 begins at 705 in which the far-end signal is separated into individual subbands. At 710, all of the subbands are passed to a far-end noise estimator unit 310 for the far-end signal, where a noise estimate sequence, $N_X$, is generated for each subband. At 715, the near-end signal is passed through a filter bank 225 and separated into individual subbands. Next, at 720, the subbands of the near-end signal are input to the near-end noise estimator 330, which generates a near-end noise estimate, $N_Y$, for each subband.

At 725 a full band noise-adaptive gain value is computed using the noise estimates, $N_Y$, of the subbands. Simultaneously, a level normalization gain value is computed at 730 using the full band far-end signal. At 735, the level normalization gain value and the noise-adaptive gain value are combined to create a total gain value, $G_{TOT}$. At 740, the total gain value, $G_{TOT}$, is passed to a compressor gain unit 320 along with the far-end subband signals. The total gain value, $G_{TOT}$, is used by the compressor gain unit 320 to vary the compressor onset point on the compressor gain curves. The onset point for the compression region can be controlled in three different ways: input-bounded, output-bounded, or mixed input-output bounded.

At 745 an expander gain value, $G_E$, is computed using the far-end noise estimate, $N_X$, for each subband. At 750, a master gain unit 345 computes a master gain value, $G_M$, for each subband of the far-end signal. Finally, at 755, the master gain value of each subband is combined with the corresponding far-end subband signal.

Figure 8:
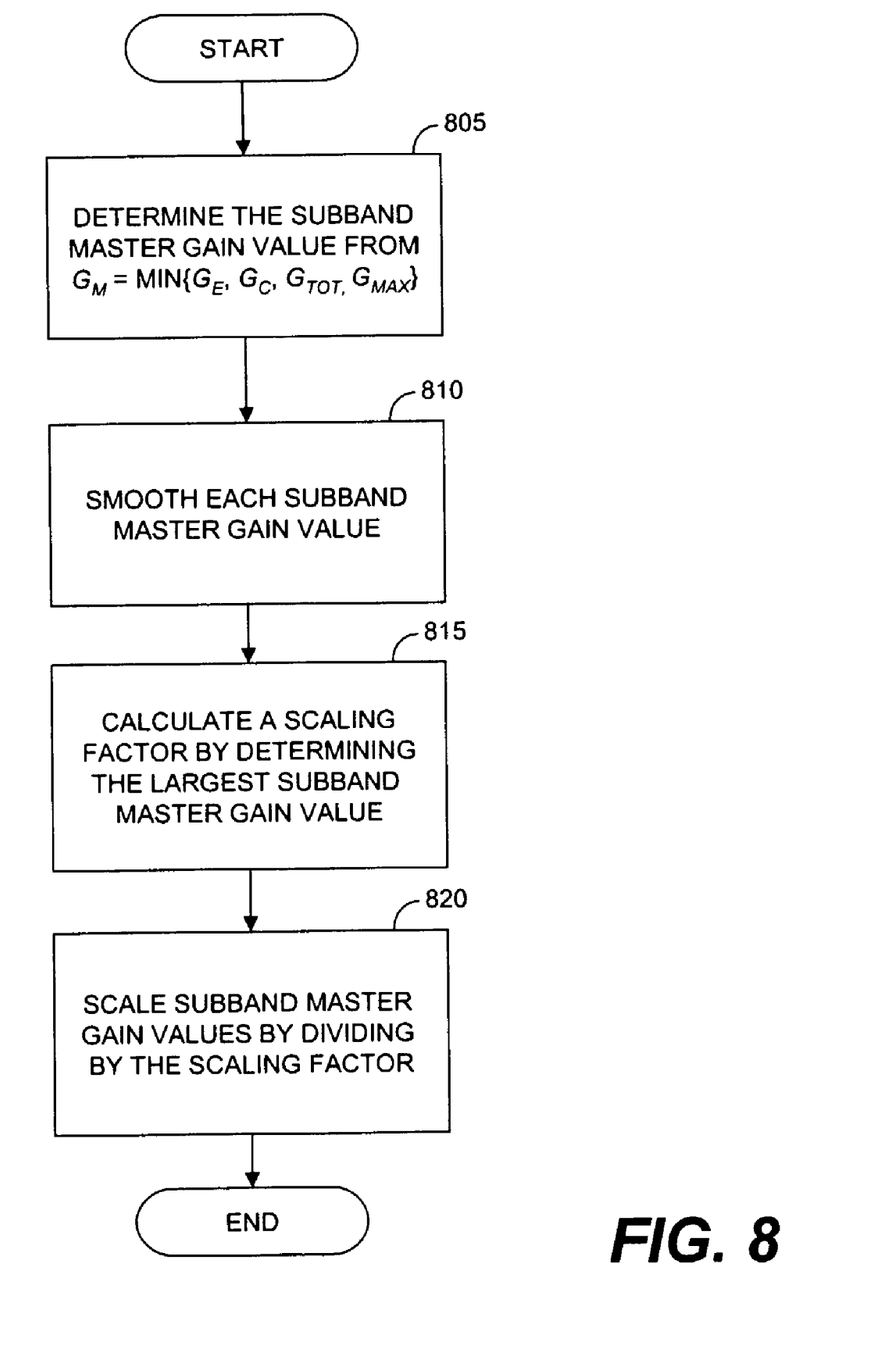
FIG. 8 is a logic flow diagram illustrating an exemplary routine for computing a master gain value in accordance with the present invention.

FIG. 8 is a logic flow diagram illustrating routing 800 from step 750 (FIG. 7) of an exemplary method for computing the scaled master gain value, $\tilde{G}_M$, for each subband. At 805, the master gain value, $G_M$, for each subband is selected by taking the minimum value among the expander gain, $G_E$, the compressor gain value, $G_C$, the total gain value, $G_{TOT}$, and a user-configurable maximum gain value, $G_{MAX}$. That is, the master gain value, $G_M$, for each subband of the far-end signal may be expressed by the equation:

$$G_M = \min\{G_E, G_C, G_{TOT}, G_{MAX}\}$$

At 810, each master gain value, $G_M$, is smoothed by applying a smoothing filter. This filtering operation can be performed along the frequency axis, along the time axis, or both the frequency and time axis. In the exemplary embodiment, each master gain value is smoothed by using a second order finite-impulse response (FIR) filter with three coefficients, in which case only three neighboring values are used. Thus, the master gain values smoothed across frequency may be represented by the equations:

$$\overline{G}_M(k,i) = \frac{1}{4}G_M(k-1,i) + \frac{1}{2}G_M(k,i) + \frac{1}{4}G_M(k+1,i)$$

where $G_M(k,i)$ is the master gain value for the $k^{th}$ subband at time instance i. Likewise, the master gain $\tilde{G}_M(k,i)$, smoothed across time may be represented by the equation $$\tilde{G}_M(k,i) = \frac{1}{2}\overline{G}_M(k,i) + \frac{1}{3}\overline{G}_M(k,i-1) + \frac{1}{6}\overline{G}_M(k,i-2)$$

At 815, a scaling factor, c, is calculated and applied to each of the smoothed subband master gain values. The scaling factor is calculated by taking the maximum from all of the smoothed master gain values, $c = \max\{\tilde{G}_M(0,i), \tilde{G}_M(1,i), \ldots \tilde{G}_M(N-1,i)\}$. Finally, at 820, each smoothed master gain value is divided by the scaling factor, c, to produce a scaled master gain value equal to or less than one for each subband. The scaled gain values may be calculated using the equation:

$$\hat{G}_M(k,i) = \frac{1}{c} * \tilde{G}_M(k,i) \quad \text{for } 0 \le k \le N-1$$

For implementation efficiency, a larger scaling factor may be used, such as the maximum gain value rounded up to the nearest power of 2 (2, 4, 8, 16, 32, etc.).

Figure 9:
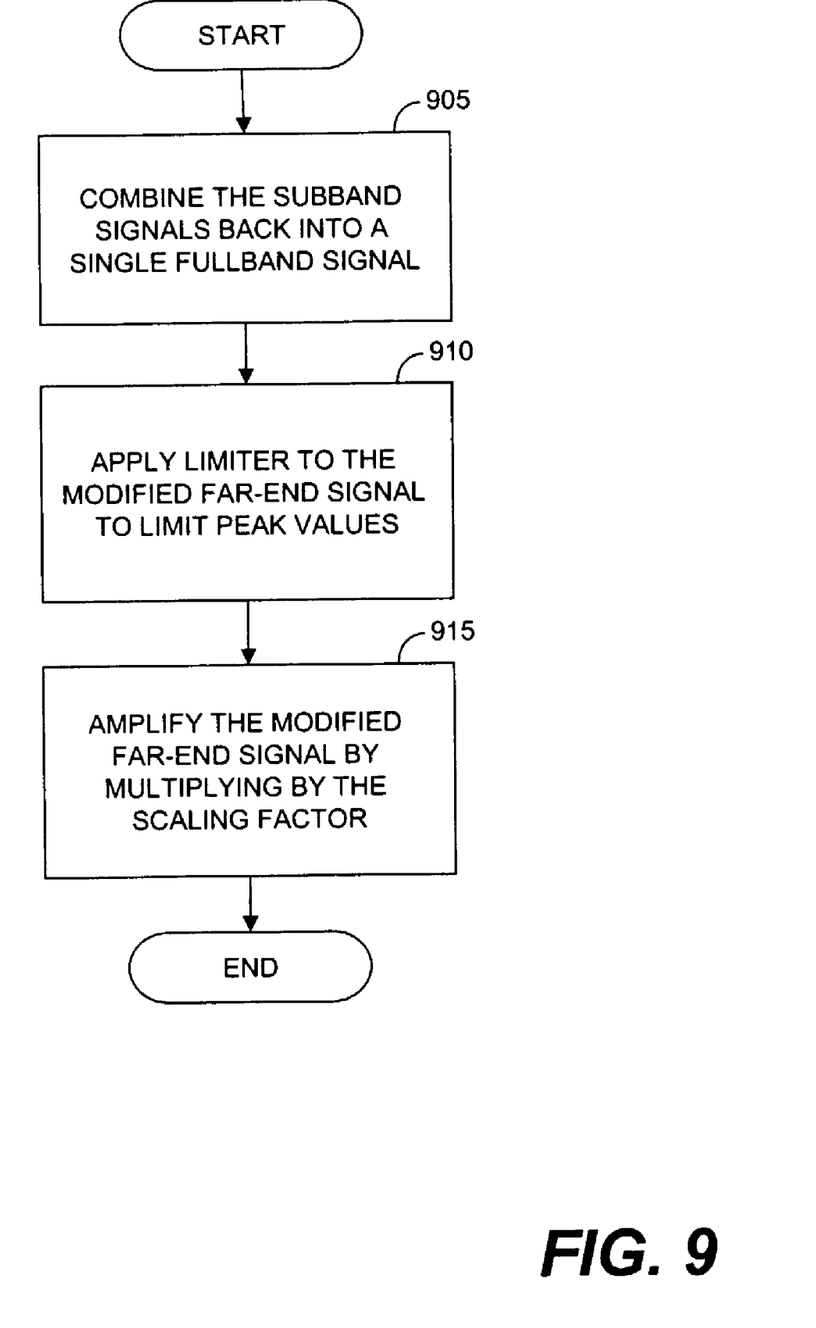
FIG. 9 is a logic flow diagram illustrating an exemplary routine for combining a scaled gain factor with the subband components of the far-end signal in the mixed time-frequency compander and reconstructing the modified far-end signal.

FIG. 9 is a logic flow diagram illustrating routine 900 from step 755 of FIG. 7 illustrating an exemplary routine for combining the scaled subband gain values with the far-end subband signals. Routine 900 begins at 905, in which the subbands are combined into a full band signal. A synthesis filter bank 360 is typically used to recombine the individual subband signals into a single full band signal.

At 910, the full band signal is then input to a limiter 365 along with the scaling factor, c. The limiter 365 reduces the "peaks" in the full band signal to eliminate any potential saturation when the full band signal is amplified. Lastly, at 915, the full band signal is input to a reverse scaling unit 370, which amplifies the full band signal by multiplying it by the scaling factor, c. The scaled full band signal is then provided to the near-end.

Other alternative embodiments will become apparent to those skilled in the art to which an exemplary embodiment pertains without departing from its spirit and scope. Accordingly, the scope of the present invention is defined by the appended claims rather than the foregoing description.

I claim:

1. A noise-adaptive compander adapted to amplify a far-end signal which comprises a plurality of subbands comprising:

a master gain unit operable for generating a master gain value for each subband;

a scaling unit operable for creating a scaled master gain value by applying a scaling factor to the master gain value for each subband;

a combiner operable for combining the scaled master gain for each subband of the far-end signal with the far-end signal;

a synthesis filter bank operable for receiving the output of the combiner unit and generating a full-band signal;

a limiter unit operable for reducing peaks in the full-band signal; and a reverse scaling unit operable for creating a modified far-end signal by multiplying the full-band signal with the scaling factor.

2. The compander of claim 1, further comprising:

a noise-adaptive gain control (NGC) unit operable for generating a noise-adaptive gain value using a near-end noise estimate;

an expander unit operating in the frequency domain and operable for:

receiving the plurality of subbands; and computing an expander gain value for each of the plurality of subbands using subband far-end noise estimate, the subband signal level, and an adjustable prototype expander gain curve; and a compression unit operating in the frequency domain operable for:

receiving the plurality of subbands; and computing a compression gain value for each of the plurality of subbands using the noise-adaptive gain value, the subband signal level, and an adjustable prototype compression gain curve.

3. The compander of claim 2, wherein the master gain value is equal to a minimum gain value selected from the compression value, the expander gain value, and the noise-adaptive gain value.

4. The compander of claim 2, further comprising:
an AGC gain unit operable for computing a level normalization gain value for the far-end signal in the time domain;
a combiner for combining the noise-adaptive gain value and the level-normalization gain value into a total gain value; and using the total gain value to compute a compression gain value for each subband.

5. The compander of claim 4, wherein the master gain value is equal to a minimum value from the compression gain value, the expander gain value, and the total gain value.

6. The compander of claim 2, wherein the scaled master gain values are less than or equal to one.

7. The compander of claim 5, wherein the scaled master gain values are less than or equal to one.

8. The compander of claim 1, wherein the scaling factor is equal to the maximum value of the master gain values.

9. The compander of claim 1, further comprising a gain smoothing unit operable for smoothing the master gain values in the frequency domain.

10. The compander of claim 1, operable for use in a telephone system.

11. The compander of claim 1, operable for use in an audio system.

12. The compander of claim 1, further comprising a second noise-adaptive compander in a reverse direction with the first noise-adaptive compander and adapted to amplify a near-end signal, which comprises a plurality of subbands, based on a far-end noise estimate, the second compander comprising:
a master gain unit operable for creating a master gain value for each subband;
a scaling unit operable for creating a scaled master gain value for each subband by applying a scaling factor to each master gain value for each subband;
a combiner operable for combining the scaled master gain values for each subband of the near-end signal with the near-end signal; and
a synthesis filter bank operable for receiving the output of the combiner unit and generating a full-band signal;
a limiter unit operable for reducing peaks in the full-band signal; and a reverse scaling unit operable for creating a modified near-end signal by multiplying the full-band signal with the scaling factor.

13. The compander of claim 12, wherein the gain unit of the second compander comprises:
a noise-adaptive gain control (NGC) unit operable for generating a noise-adaptive gain value using far-end noise estimates;
an expander unit operating in the frequency domain and operable for: receiving the plurality of subbands; and computing an expander gain for each of the plurality of subbands using the subband near-end noise estimate, the subband signal level, and an adjustable prototype expander gain curve;
a compression unit operating in the frequency domain operable for: receiving the plurality of subbands; and computing a compression gain for each of the plurality of subbands using the noise-adaptive gain value, the subband signal level, and an adjustable prototype compression gain curve.

14. The compander of claim 13, wherein the master gain value of the second compander is equal to a minimum gain value selected from the compression value, the expander gain value, and the noise-adaptive gain value.

15. The second compander of claim 12, wherein the second compander further comprises:
an AGC gain unit operable for computing a level normalization gain value for the near-end signal in the time domain;
a combiner for combining the noise-adaptive gain value and the level-normalization gain value into a total gain value; and using the total gain value to generate the compression gain value for each subband.

16. The compander of claim 15, wherein the minimum gain value in the second compander is equal to a minimum value selected from the compression gain value, the expander gain value and the total gain value.

17. The compander of claim 12, wherein the scaled master gain values in the second compander are less than or equal to one.

18. The compander of claim 15, wherein the scaled master gain values in the second compander are less than or equal to one.

19. The compander of claim 15, wherein the scaling factor in the second compander is equal to the maximum gain value of the selected gains for each subband of the near-end signal.

20. The compander of claim 12, wherein the second compander further comprises a gain smoothing unit operable for smoothing the master gain values in the frequency domain.

21. The compander of claim 12 operable for use in a communications network.

22. A method of amplifying a far-end signal which comprises a plurality of subbands, comprising:
selecting a master gain value for each subband;
applying a scaling factor to the master gain value for each frequency component in the far-end signal to create a scaled master gain value;
combining the selected minimum gains for each subband of the far-end signal with the far-end signal;
receiving the output of the combiner unit and generating a single far-end signal;
reducing peaks in the modified far-end signal; and
amplifying the modified far-end signal by multiplying the modified far-end signal with the scaling factor.

23. The method of claim 22, further comprising:
generating a noise-adaptive gain value using a near-end noise estimate;
computing an expander gain value for each of the plurality of subbands using far-end noise estimate, the subband signal level, and an adjustable prototype expander gain curve; and
computing a compression gain value for each of the plurality of subbands using the noise-adaptive gain value, the subband signal level, and an adjustable prototype compression gain curve.

24. The method of claim 23, wherein the master gain value is equal to a minimum gain value from the compression value, the expander gain value, and the noise-adaptive gain value.

25. The method of claim 23, further comprising:
computing a level normalization gain value for the far-end signal in the time domain;
combining the noise-adaptive gain value and the level-normalization gain value into a total gain value; and
using the total gain value, the subband level, and an adjustable prototype compression gain curve to generate the compression gain.

26. The method of claim 25, wherein the master gain value is equal to a minimum value selected from the compression gain value, the expander gain value, and the total gain value.

27. The method of claim 22, wherein the scaling factor is equal to the maximum gain value of the selected master gain values for each subband of the far-end signal.

28. The method of claim 22, further comprising smoothing the master gain in the frequency domain.

29. A method of coupling a noise reduction gain to a noise compensation gain to avoid intermodulation and cross modulation, comprising:

calculating a total gain value from a near-end signal by separating the near-end signal into a plurality of subbands and generating a noise estimate sequence for each subband; and using the noise estimate sequence for each subband to calculate the total gain value;

setting a linear range of the noise compensation gain using the total gain value; and setting a maximum noise reduction gain value such that the sum of the maximum noise reduction gain value and the total gain value equals a predefined value.

* * * * *